United States Patent [19]

Edmonds et al.

[11] 4,135,001
[45] Jan. 16, 1979

[54] PROCESS FOR ENHANCING THE COLOR AND FLAVOR OF TEA

[75] Inventors: Christopher J. Edmonds, South Nutfield, England; Geir V. Gudnason, Atlanta, Ga.

[73] Assignee: Tenco Brooke Bond, Ltd., Great Britain

[21] Appl. No.: 827,397

[22] Filed: Aug. 24, 1977

[51] Int. Cl.² .......................... A23L 1/275; A23F 3/00
[52] U.S. Cl. ..................................... 426/250; 426/597; 426/49
[58] Field of Search .................. 426/250, 597, 435, 49

[56] References Cited

U.S. PATENT DOCUMENTS

| 2,181,549 | 11/1939 | Grethe | 426/597 |
| 3,438,785 | 4/1969 | Zameitat | 426/49 |
| 3,959,497 | 5/1976 | Takino | 426/597 |

Primary Examiner—Raymond N. Jones
Assistant Examiner—Elizabeth A. Hatcher
Attorney, Agent, or Firm—Michael J. Gilroy; Robert A. Lester; John R. Martin

[57] ABSTRACT

Tea compositions having improved color and flavor are produced by adding water-soluble aluminum salt(s) to the compositions or precursors during any stage of the manufacture up to the point of consumption, or even by coating or spraying the tea leaves prior to plucking and processing. Enhanced characteristics obtained as a result of this addition include increased redness and brightness and improved flavor.

32 Claims, No Drawings

PROCESS FOR ENHANCING THE COLOR AND FLAVOR OF TEA

FIELD OF THE INVENTION

This invention relates to tea compositions having improved color and flavor and to a process for preparing such compositions. More particularly, the invention is directed to tea compositions containing added aluminum in a form and an amount effective to provide a tea infusion having enhanced color and flavor characteristics.

BACKGROUND OF THE INVENTION

The crop harvested from the tea plant, *Camellia sinensis*, comprises young leaf (green leaf) shoots which consist essentially of two or more leaves and the unopened terminal leaf bud or tip. This crop when suitably processed results in the various types of tea of commerce. For instance, black leaf tea is generally made by subjecting the plucked leaves (green leaf) to a series of traditional processing steps including (1) withering, (2) disintegration of the leaves by rolling, macerating or otherwise bruising the withered leaf to release the juices and enzymes, (3) fermentation (enzymatic oxidation) to develop the characteristic color and flavor, the latter including taste and aroma, of black tea, and (4) firing or drying, to deactivate the enzymes which catalyze fermentation. The extent of the fermentation varies in commercial practice, from black to various gradations between green and black. Partially fermented tea is known as "oolong" tea. An infusion of dried black leaf in hot water provides a liquor having a color ranging from gray to golden to brown to rosy pink in hue and exhibiting various degrees of brightness. It is generally considered that a bright orange-red or red color is most desirable, but this depends on the intended market for the tea. It is known that the color and flavor of a black tea infusion are influenced by the nature of the aforesaid processing steps. Another factor which also affects the color and flavor is the nature of the original green leaf from which the tea is manufactured, as determined by the type of plant locality and conditions under which the tea is grown. Factors such as the country of origin, soil conditions, rainfall and other climatic variations all have a bearing on the quality of the tea, and variations may occur not only from one locality to another, but also from one season to another for tea grown at the same location.

Similar considerations apply to the quality of the various instant black teas which conventionally are manufactured by extracting the water-soluble ingredients produced during black leaf tea manufacture and forming by known techniques hot or cold water-soluble concentrated tea extracts or tea powders. Optionally, it is known to produce such extracts or powders from green tea extract by slurry fermentation or by non-enzymatic chemical conversion. Again, because of variability of the starting tea and the nature of the processing, the control of tea color and flavor is difficult. The determination of quality of the tea tends to be a subjective assessment by the tea taster. From these considerations, it will be appreciated that there is a long-felt need for being able conveniently to modify the organoleptic qualities of black tea, particularly from the standpoint of enhancing the color and flavor attributes thereof.

As used in the present application, the term "tea" is intended to mean leaf tea (unless otherwise specified, black or oolong), aqueous extracts and infusions of tea and tea compositions produced therefrom in either liquid or powder form and which are hot water-soluble or cold water-soluble and fractions thereof.

It is known that the color of an infusion of black tea is provided by the oxidation of polyphenols. These colored oxidation products may be divided into two classes, theaflavins and thearubigins. The former may be separated from the latter by extraction of an aqueous extract of tea with ethyl acetate, the theaflavins being extracted into the ethyl acetate. Characteristically, the theaflavins impart a yellowish color to a tea infusion which may approach a bright orange-red color in concentrated solution, whereas thearubigins impart a reddish-brown color. The total color of the tea is related to the sum of the theaflavin and thearubigin contents and, hence, to strength, whereas brightness is primarily an expression of the proportion of the color due to the theaflavins. In a given black tea infusion, if the thearubigin value is high and the theaflavin value low, the tea is considered dull. If the levels of both the theaflavins and thearubigins are low, then the tea is thin and gray. To achieve the normally preferred bright orange-red or red color, it is believed that the tea should contain an average thearubigin content and a high theaflavin content.

It is also known that the tea plant is an aluminum accumulator and the aluminum content in the plucked leaves from the naturally occurring tea plants is generally within the range of from 200 to 1000 ppm by weight (dry basis) as compared with 50 to 100 ppm in other plant species. The stated aluminum content is normally also present in black and oolong teas. The role of aluminum in the metabolism of the tea plant has been a matter of some speculation without resolution. The effect of variations in the amount of aluminum accumulated in the leaf on tea infusions has not been known.

SUMMARY OF THE INVENTION

Surprisingly, and in accordance with the present invention, it has now been found that the color and flavor of a black or oolong tea infusion may be enhanced, improved and modified by the addition of a suitable aluminum compound to the tea leaves prior to plucking or to the tea composition during any stage of the manufacturing or make-up of the tea from plucking to the point of consumption. Thus, in accordance with this invention, there is provided a tea-containing composition comprising black or oolong tea having incorporated therein added aluminum in a combined form and in an amount effective to provide a beverage having enhanced or modified color and flavor relative to the same tea beverage without said added aluminum.

The invention also provides a process for preparing an enhanced or modified tea composition, which comprises treating black or oolong tea or instant tea at any stage during its manufacture or infusion, or by spraying or coating of the tea leaves prior to plucking, with a suitable aluminum compound in an amount effective to provide an enhancement or modification in color and flavor characteristics of the final tea beverage.

These and other features and advantages of the present invention will become more readily apparent to those skilled in the art from a consideration of the following detailed description and the appended claims.

DETAILED DESCRIPTION

By enhanced or modified color and flavor characteristics is meant characteristics which are enhanced or modified to provide a more desirable tea as compared to a less desirable tea as determined by an experienced tea taster. The enhanced characteristics achieved by the present invention include increased redness, intensity of redness and brightness and improved flavor for both milk-containing and non-milk tea. The beneficial results of the invention may be realized with any black or oolong tea.

In performing the process of the present invention, the tea is treated with a non-toxic, suitably reactive aluminum compound, preferably a water-soluble aluminum compound. Various water-soluble aluminum salts have substantially the same effect in the color and flavor enhancement of the tea composition and, for example, aluminum sulfate, aluminum chloride, potassium aluminum sulfate, aluminum nitrate and the like may be suitably employed. Also, solutions of sodium aluminate or potassium aluminate may be used. A particular source of aluminum is the ash produced from the combustion of mature tea leaves having a high aluminum content. It has been reported that mature leaves may contain up to 17,100 ppm aluminum based on the dry weight of leaf. Although such leaves are not suitable for ordinary tea production, they can prove useful as a source of aluminum for the process of the present invention. Depending on the stage of addition, the aluminum compound may be added in various forms, for example, as a powder or as an aqueous solution.

The amount of aluminum added to the tea is that amount sufficient to impart to the tea product the desired color and flavor. However, in certain cases, tea products with more than the normal redness and brightness are needed, for example, when such small amounts of instant teas are used in liquid or dried compositions that only a very light color is contributed to the overall compositions by the tea. In addition, such compositions are usually consumed at low pH values (as would occur with added lemon) which further lightens the tea color. In such cases, the color of the tea is often not sufficiently dark for desired appearance of the beverage and thus needs to be augmented. It is an advantage to achieve the desired darkening by the process of the present invention rather than by the addition of food colorings.

Thus, the amount of aluminum compound to be added to any particular tea will depend upon the inherent color and flavor properties of the starting material and the color and flavor properties desired. Because of wide variations in inherent organoleptic characteristics, it is not possible to fix definite limits on the amounts of aluminum addition. However, based upon experiments with selected teas, the addition of aluminum (as aluminum sulfate) in an amount from 60 to 4,800 ppm, preferably from 60 to 1000 ppm, of aluminum by weight, based upon the dry weight of the total tea solids, has been found to be suitable to provide an appropriate modification of color and flavor, the actual amount used within these ranges being dependent upon the characteristics of the initial starting material and the characteristics desired in the final product.

The reaction of the tea with aluminum proceeds at almost any temperature, such as, at room temperature or at elevated temperature (e.g., boiling). The reaction proceeds readily at pH values of about 3.3 to 7.0. Increasing the pH of a tea brew containing added aluminum generally increases the depth of the red color.

As stated previously, the aluminum may be added to the tea at any stage during its manufacture. It has been unexpectedly found that if the aluminum compound is added before or during fermentation, for example, in the case of air fermentation, by spraying the leaf with an aqueous solution of the aluminum compound, the time needed to bring the color and flavor of the fermenting tea to the point at which fermentation is considered complete is thus reduced.

This speed-up of color and flavor development in fermentation resulting from the process of the present invention is particularly useful in certain teas where the time to complete the fermentation is so long that the color becomes dull with the flavor being adversely affected. Also, in the case of batch processing, reduction of the fermentation time reduces the number of fermentation trays, or skips, or any fermentation equipment needed, thereby reducing the capital cost in a tea factory.

The aluminum compounds used as additives in the present invention may be applied in liquid form at any stage during the manufacture of any black or oolong tea product or may be added in dry form to the tea or the water for brewing or dissolving the tea at the point of consumption. Such aluminum compounds may even be added to the green tea leaves prior to plucking as by spraying or coating in dry or liquid form. The leaves are then picked with the aluminum compound adhering to or absorbed into the leaves. However, there are specific points during the manufacture of each product where the addition is most convenient or where the best conditions for maximum control of the reaction exist. For example, in the case of the manufacture of black leaf tea, the aluminum is most conveniently added just after the disintegration step, i.e., cutting or rolling of the leaf, is completed and just before fermentation commences. For slurry fermented tea, the addition may be directly to the slurry at the beginning of fermentation. Treatment of cold water-soluble tea may be before or after cold water solubilization.

When leaf tea is extracted for immediate consumption in a teapot or cup, the tea liquor is usually extracted in three to six minutes, although longer times are sometimes used. However, in the manufacture of commercial instant teas, the extraction or heating time will be much longer, depending on the manufacturing method. It is known that when leaf time is extracted for long periods, the color of the brew becomes dark and dull and the brightness and redness are lost. The process of the present invention improves the color and flavor of beverages made from tea solids obtained by extracting at high temperatures for long periods of time. Even spent tea leaf from instant tea manufacture, which when further extracted yields a raw tasting and colorless liquor, may be treated by the process of the present invention to provide a composition which will yield a palatable beverage of desirable color and flavor.

Black tea compositions produced by the process of the present invention from certain teas provide infusions up-graded to the distinctive reddish-orange or red color and corresponding superior flavor of desired teas. The improvement in the color is particularly noticeable when the infusion is made up with milk. Furthermore, the reddish color of the tea/milk infusion is intensified when the pH of the infusion is increased.

It has further been discovered that the reddish color attributable to the added aluminum is not extracted from a water infusion of the tea by ethyl acetate. Also, the ethyl acetate extract of a hot water infusion of a tea treated by the process of the present invention is lighter in color than a similar extract of the untreated tea, which indicates a lower theaflavin content in the treated tea (orange-yellow theaflavins are extracted by ethyl acetate). This further indicates that the added aluminum reacts with at least some of the theaflavins present in the original tea. This is additionally substantiated by the fact that the color of teas with a very low initial theaflavin content is not improved by the process of the present invention to the same extent as teas having a higher theaflavin content.

The following examples are given merely as illustrative of the present invention and are not to be considered as limiting. All of the taste tests on hot tea were done by expert tea tasters using standard methods.

EXAMPLE 1

A hot water-soluble tea (non-decaffeinated) having a yellowish-brown color with milk was dissolved in hot water at a solids concentration of 0.6% by weight and divided into five portions of 240 ml. To each portion was added 5 ml. of milk. To four of the samples were added increasing levels of aluminum sulfate. One had no added aluminum. The amounts added and the observations made on the appearance of each sample are recorded below.

| Sample number | ppm added Aluminum (based on weight of tea solids) | ppm added Aluminum (based on beverage volume) | Appearance with milk |
|---|---|---|---|
| 1. (Control) | 0 | 0.00 | Yellowish-brown |
| 2. | 60 | 0.09 | Slightly redder and brighter than 1. |
| 3. | 120 | 0.18 | Redder and brighter than sample 2. |
| 4. | 180 | 0.27 | Redder and brighter than samples 2 and 3. |
| 5. | 240 | 0.36 | Rosiest red color; brightest with an appearance of strength. |

EXAMPLE 2

An instant tea powder (non-decaffeinated), which in beverage form with milk added thereto was yellow-brown and light in color, was dissolved in hot water at a solids concentration of 0.6% by weight. The dissolved sample was divided into six portions of 240 ml., and 5 ml. of milk was added to each. Various aluminum compounds were added to all the samples except one (a control), and visual observations were made.

| Form of Aluminum Added | Aluminum ion (ppm based on dry solids) | Observations on appearance |
|---|---|---|
| 1. None (Control | 0 | Yellow-brown, Dull |
| 2. Aluminum sulfate solution | 100 | Red, Bright |
| 3. Aluminum chloride solution | 100 | Red, Bright |
| 4. Aluminum nitrate solution | 100 | Red, Bright |
| 5. Aluminum potassium sulfate solution | 100 | Red, Bright |

The samples with added aluminum were all redder and brighter than the control with no aluminum added. There was no discernible color difference between the samples containing the various added aluminum compounds.

EXAMPLE 3

Hot beverages (280 ml.) were made using standard methods from several brands of hot water-soluble instant teas and black teas (all non-decaffeinated) and 5 ml. of milk was added to each. To one-half of each of the samples was added a solution of aluminum sulfate so that each had 100 ppm aluminum based on total tea solids. Each of the tea beverages with added aluminum was compared with the other half of the same beverage to which no aluminum had been added. All the samples to which aluminum had been added were redder and brighter than the control samples, the actual intensity of redness and degree of brightness varying from sample to sample.

EXAMPLE 4

A hot water-soluble, non-decaffeinated instant tea powder (which when reconstituted exhibits a yellow-brown milk color) was dissolved in water at a solids concentration of 40% by weight and divided into three batches. The first batch was used as a control. To each of the others was added aluminum sulfate to provide 100 and 500 ppm, respectively, of aluminum. The three batches were then spray-dried in a commercial spray drier. The resulting powders were examined after dissolution in water at a concentration of 0.6% by weight solids with an appropriate amount of milk added thereto.

The milk color of the control sample was yellowish-brown. That of the sample containing 100 ppm aluminum had the desired redness and brightness. The milk color of the sample containing 500 ppm aluminum was more deeply red and brighter than tea is usually expected to be. Upon tasting, it was found that the samples containing the aluminum had more flavor, specifically described as more strength, than the control sample containing no added aluminum.

EXAMPLE 5

Several batches of macerated green leaf in an aqueous slurry at a weight ratio of 20 parts of water to 1 part of tea leaf (on a dry basis) were fermented with an air stream evenly dispersed throughout the slurry. The batches were allowed to ferment for 35 minutes. Aluminum sulfate (in an amount providing 200 ppm aluminum on a dry leaf basis) was added to each batch at different stages in the manufacture of dried instant hot water-soluble tea (non-decaffeinated) from the fermented tea slurries. The process points at which the aluminum was added are shown in the Table below. The visual observations made on appearance of the beverages made from the powders are recorded in the Table.

| Point of addition of aluminum | Observations on Appearance without milk | Observations on Appearance with milk |
|---|---|---|
| 1. At no point (Control) | Turbid, Yellow | Yellowish-brown, Dull Thin |
| 2. Before fermentation | Clearer, Red | Red, Bright, Thick |
| 3. After fermentation, before hot extraction | Clearer, Red | Red, Bright, Thick |
| 4. After hot extraction, with leaf still present | Clearer, Red | Red, Bright, Thick |

-continued

| Point of addition of aluminum | Observations on Appearance | |
|---|---|---|
| | without milk | with milk |
| 5. After removal of spent leaf | Clearer, Red | Red, Bright, Thick |
| 6. After concentration to 40% solids | Clearer, Red | Red, Bright, Thick |

The appearance of the samples with added aluminum was very similar at whichever point the addition was made. In all of these experiments, the appearance of the samples with added aluminum was more attractive than the control sample with no added aluminum.

EXAMPLE 6

To demonstrate the effect of the addition of aluminum sulfate during the manufacture of black tea (non-decaffeinated), the following experiment was performed in a commercial black tea factory.

By the use of atomizing spray apparatus, solutions of aluminum sulfate were applied to the CTC cut leaf being conveyed into fermentation tubs (each with a capacity of holding 50 kg. of cut leaf). Two levels of aluminum sulfate were employed, using the same amount of sprayed liquid (containing 4% and 8% aluminum, respectively). Controls without added aluminum were subsequently processed in the same way as the experimental samples. The tubs containing the experimental samples and controls were attached to an air supply and allowed to ferment. The following Table shows the amounts of aluminum added to the experimental samples and the length of time required to complete fermentation according to the factory's standard way of judgment (by color and aroma).

| Samples | Aluminum added (ppm based on dry weight of tea) | Time to complete fermentation |
|---|---|---|
| Control 1 | 0 | 72 minutes |
| Experimental 1 | 190 ppm | 60 minutes |
| Control 2 | 0 | 78 minutes |
| Experimental 2 | 380 ppm | 38 minutes |

The batches were then fired in the normal way. Samples were brewed in the standard manner for evaluating teas (including addition of milk), and the following observations made on appearance and taste.

| Sample | Observation |
|---|---|
| Control 1 | Red, Bright, Brisk, Raw |
| Experimental 1 | Slightly redder, Brighter, More mature |
| Control 2 | Red, Bright, Brisk, Raw |
| Experimental 2 | Redder, Very Bright, Mature |

Importantly, the samples containing the added aluminum, and having much shorter fermentation times than normal in this particular black tea factory, did develop a normal or better than normal tea color, and yielded brews which were mellower or more mature than the fresh, conventionally made tea which had a raw taste.

EXAMPLE 7

Several commercial and experimental cold water-soluble instant teas (non-decaffeinated) were dissolved in water at 0.4% solids concentration. To each tea was added 100 ppm aluminum (as aluminum sulfate). Each had a control sample with no added aluminum for comparison. Visual observations were made on the beverages in transparent glasses, and also in white cups with 4 ml. of milk added to the beverages. All the samples containing the added aluminum were slightly darker and redder than their controls when viewed in transparent glasses. When viewed in white cups with milk the differences were accentuated. The samples containing aluminum all had significantly more redness than the samples without added aluminum when evaluated with milk added thereto.

EXAMPLE 8

Black leaf (non-decaffeinated) was extracted at a 20:1 weight ratio of water (at 95° C.) to tea. The extract was concentrated to 6% solids and divided into 2 portions of 10 gallons each. To one portion was added 1000 ppm of aluminum in the form of aluminum sulfate; to the other portion no aluminum was added. Both portions were then chilled to 2° C. and centrifuged in a continuous, automatically desludging disc type centrifuge. The clarified portions were spray-dried in a pilot plant size spray dryer. The insoluble portions were chemically solubilized by a conventional method, well known in the art. The chemically solubilized liquors were then chilled to 2° C., centrifuged to remove any remaining insoluble material, and spray-dried in the pilot plant size spray dryer.

Three parts of clarified dry solids and one part of solubilized solids were admixed to form each set of samples. The samples were dissolved in water at 7° C., and at 0.43% by weight solids concentration. The sample containing aluminum was clearer in solution, had a more balanced taste and was redder both without and with milk (5 ml. unhomogenized cow's milk) than the sample without added aluminum.

EXAMPLE 9

A number of samples of tea were evaluated for color as described herein. Each sample of 10 gm. of black tea leaf (non-decaffeinated) was infused in 500 ml. of boiling water. Each infusion was stirred for 5 seconds after one minute and again after two minutes. 20 ml. of milk was added after three minutes. After 4.5 minutes each infusion was strained into a cell for measuring, in a Hunter Laboratory Color Difference Meter, A/B values which were read after five minutes. Some of the samples were control samples containing no added aluminum and other samples contained added aluminum according to the invention where the addition (as aluminum sulfate) had been made either before or after fermentation. The fermentation times and the color values obtained are shown in the following Table:

| Sample No. | Added aluminum (ppm) | Addition (Before or after fermentation) | Fermentation Time (minutes) | A/B values |
|---|---|---|---|---|
| 1. | — | — | 70 | 0.76 |
| 2. | 760 | before | 70 | 0.92 |
| 3. | 530 | after | 70 | 0.85 |
| 4. | 360 | before | 40 | 0.86 |
| 5. | 180 | before | 60 | 0.79 |
| 6. | 740 | before | 30 | 0.88 |
| 7. | — | — | 70 | 0.79 |
| 8. | — | — | 70 | 0.74 |
| 9. | — | — | 70 | 0.71 |

The A/B values, which represent the red/yellow ratios on the Hunter scale, give an indication of the redness of the sample, the higher the A/B value the redder the color.

The Control Samples 1, 7, 8 and 9, all of which required a fermentation time of 70 minutes, gave color values varying from 0.71 to 0.79, showing that variations may occur due to different fermentation conditions. But significantly, all the control samples had lower values than the samples with added aluminum for similar fermentation times, whether the aluminum was added before (Sample 2) of after (Sample 3) fermentation.

Even for a low level addition of aluminum (Sample 5) the highest color value obtained in the control samples was achieved at a shorter fermentation time.

The results in the above Table clearly demonstrate that the process of the present invention provides teas having increased redness with respect to untreated teas and also provides a reduction in fermentation time to achieve the same or increased redness in teas as that of similar untreated teas.

EXAMPLE 10

To show the effect of altering the pH of a solution of a hot water-soluble tea (non-decaffeinated) containing added aluminum, a dried tea extract was dissolved at 0.4% by weight concentration in hot water. To this solution was added 500 ppm aluminum (as aluminum sulfate based on the dry weight of the tea). The pH of the tea solution was 4.5. The pH was then adjusted both towards the alkaline and acid side, and the following observations made.

| pH of solution | | Observation |
|---|---|---|
| without milk | with milk | on color |
| 3.3 | 3.9 | |
| 4.0 | 4.7 | |
| 4.7 | 5.4 | increasing |
| 5.5 | 5.9 | redness |
| 6.0 | 6.3 | |
| 6.5 | 6.6 | |
| 7.0 | 6.6 | |

EXAMPLE 11

To show that the formation of red color in tea with added aluminum is related in a large degree to the ethyl acetate-soluble fraction of tea, and that the red color may be formed by adding aluminum to this fraction, the following experiment was performed.

One hundred ml. of a 0.5% solution of dried black tea extract (non-decaffeinated) was extracted with 100 ml. of ethyl acetate. The ethyl acetate layer was then extracted with a 2.5% solution of freshly made sodium bicarbonate solution, which was discarded, and then the ethyl acetate was evaporated to leave a dry orange colored residue. The residue was dissolved in 100 ml. of distilled water and 1000 ppm (on dry basis of the residue) of aluminum (as aluminum sulfate) was added to the aqueous solution, which changed its color from yellow-orange to an intense red. This solution was shaken with 100 ml. of ethyl acetate, and upon separation of the layers it was noted that the ethyl acetate had not extracted any color from the aqueous fraction.

EXAMPLE 12

Fifty grams of old, mature tea leaves (with about 75% by weight moisture) were ashed. The ash was then extracted with 100 ml. of hot water, decolorized with activated charcoal and filtered to obtain a clear colorless solution.

When 0.2 ml. of this solution was added to an instant tea brew (non-decaffeinated) with a yellowish color, the beverage became markedly redder, showing that the ash from mature tea leaves (which are known to contain large amounts of aluminum) does indeed contain material which will cause formation of red color in tea.

EXAMPLE 13

To show that the precursors for color reaction with aluminum are not present in unfermented tea material the following experiment was performed. Fresh green leaf was macerated as in normal black tea (non-decaffeinated) manufacture and immediately extracted with boiling water to yield an extract with approximately 0.3% solids. To this extract was added 500 ppm (by weight of dry tea leaf) of aluminum (as aluminum sulfate). A non-decaffeinated oolong tea and a black tea (Kenya) were extracted in the same way as the green leaf. To each of the extracts made from dry teas was added 500 ppm of aluminum in the form of aluminum sulfate. The observations made are shown below:

| | Color observations | |
|---|---|---|
| Extract | No aluminum | With 500 ppm aluminum |
| Fresh green leaf | Green | Slightly greener |
| Oolong tea | Yellow and slightly red | Markedly more red |
| Black tea (Kenya) | Red | Markedly more red |

EXAMPLE 14

In this Example the effect of added aluminum on teas of various geographic origin, method of manufacture and grade was investigated.

Each tea (non-decaffeinated) was brewed by infusing 5.6 g. of leaf in 280 ml. of boiling water for 6 minutes in accordance with standard practice. The liquors were divided into two equal portions and 500 ppm (based on the dry weight of the tea) of aluminum (as aluminum sulfate) was added to one of each of the portions. The samples were first classified into five categories of color (from very light to very dark) without added aluminum and then rated for color improvement with added aluminum, in terms of increased redness and brightness, without and with milk (5 ml.)

The results are shown in the following Table and the optical density (at 460 MN) of the fractions extracted with ethyl acetate (sodium bicarbonate washed) from each of the teas without added aluminum was determined as shown in the Table.

| Tea Type | Optical Density of Ethyl Acetate Extract without added aluminum (O.D. at 460 MN) | Color without added aluminum | Color improvement by aluminum (without and with milk) |
|---|---|---|---|
| 1. South Indian CTC Fannings | 0.16 | light yellow | moderate |
| 2. Uganda CTC Dust | 0.64 | very dark | moderate |
| 3. Tanzania CTC PF 1 | 0.65 | dark | very marked |

| Tea Type | Optical Density of Ethyl Acetate Extract without added aluminum (O.D. at 460 MN) | Color without added aluminum | Color improvement by aluminum (without and with milk) |
|---|---|---|---|
| 4. Malawi CTC PF | 0.29 | average | slight |
| 5. Turkish Orthodox PF | 0.055 | very light yellow | slight |
| 6. Indonesia Orthodox BOP 1 | 0.22 | average | moderate |
| 7. Kenya Orthodox BOP | 0.38 | average | marked |
| 8. Sri Lanka Orthodox BOP | 0.21 | average | moderate |
| 9. USSR Orthodox BOP | 0.05 | very light yellow | slight |

The invention being thus described, it will be obvious that the same may be varied in many ways. Such variations are not to be required as a departure from the spirit or scope of the invention, and all such modifications are intended to be included within the scope of the following claims.

We claim:

1. A process for improving the color and flavor of a non-decaffeinated beverage consisting essentially of tea, said process comprising adding a non-toxic aluminum salt to said beverage or a precursor thereof in an amount effective to enhance the color and flavor of said beverage, said adding being done at any stage during or prior to the manufacture and preparation of said beverage.

2. A process according to claim 1 wherein said beverage contains black or oolong tea.

3. A process according to claim 2 wherein said beverage is an aqueous extract or infusion of black or oolong tea.

4. A process according to claim 3 wherein said beverage is prepared at least in part from spent leaf from instant tea manufacture.

5. A process according to claim 3 wherein said beverage includes milk.

6. A process according to claim 3 wherein the pH of said beverage or precursors thereof is raised such that the color and flavor of said beverage are further improved.

7. A process according to claim 2 wherein said aluminum salt is a water-soluble aluminum salt.

8. A process according to claim 7 wherein said water-soluble aluminum salt is selected from the group consisting of aluminum sulfate, aluminum chloride, potassium aluminum sulfate, aluminum nitrate, sodium aluminate and potassium aluminate.

9. A process according to claim 7 wherein the source of the water-soluble aluminum salt is the ash produced from the combustion of mature tea leaves having a high aluminum content.

10. A process according to claim 7 wherein the amount of water-soluble aluminum salt is about 60 to 4800 ppm of aluminum by weight, based upon the dry weight of the total tea solids.

11. A process according to claim 7 wherein the amount of water-soluble aluminum salt added is about 60 to 1000 ppm of aluminum by weight, based upon the dry weight of the total tea solids.

12. A process according to claim 7 wherein the water-soluble aluminum salt is added in the form of a solution.

13. A process according to claim 7 wherein the water-soluble aluminum salt is added in dry form.

14. A process according to claim 7 wherein during said manufacture and preparation, green leaf tea is fermented and said water-soluble aluminum salt is added prior to or during fermentation.

15. A process according to claim 14 wherein said water-soluble aluminum salt is sprayed or coated onto the green leaf prior to plucking.

16. A process according to claim 14 wherein said water-soluble aluminum salt is added just before beginning fermentation.

17. A process according to claim 7 wherein during said manufacture and preparation green leaf tea is fermented, and said water-soluble aluminum is added after fermentation.

18. A process according to claim 7 wherein said beverage contains an instant tea and during said manufacture and preparation green tea is slurry fermented and said water-soluble aluminum salt is added at the beginning of fermentation.

19. A process according to claim 18 wherein said water-soluble aluminum salt is added after slurry fermentation.

20. A process according to claim 7 wherein said beverage contains an instant tea and during said manufacture and preparation green tea is fermented and an extract of the fermented green tea is prepared.

21. A process according to claim 20 wherein said water-soluble aluminum salt is added to said extract or a concentrate thereof.

22. A process according to claim 20 wherein said extract or a concentrate thereof is spray-dried into a powder.

23. A process according to claim 22 wherein said water-soluble aluminum salt is added to said powder.

24. A process according to claim 22 wherein, during the manufacture and preparation of said instant tea, cold water insolubles are solubilized or removed therefrom.

25. A process according to claim 24 wherein said water-soluble aluminum salt is added before said cold water insolubles are solubilized or removed.

26. A process according to claim 24 wherein said water-soluble aluminum salt is added after the cold water insolubles are solubilized or removed.

27. A process for improving the color and flavor of a decaffeinated beverage consisting essentially of tea, the tea component of which is black or oolong tea prepared by fermentation of green tea, said process comprising adding a non-toxic aluminum salt to the green tea, said salt being added in an amount effective to enhance the color and flavor of said beverage, said adding being done at a time from prior to plucking to during fermentation.

28. A process according to claim 27 wherein said aluminum salt is a water-soluble aluminum salt.

29. A process according to claim 28 wherein said water-soluble aluminum salt is added to said green leaf prior to or at the beginning of fermentation.

30. A product prepared by the process of claim 1.

31. A product prepared by the process of claim 3.

32. A product prepared by the process of claim 27.